United States Patent [19]

Ely

[11] 4,265,311

[45] May 5, 1981

[54] METHODS OF WATER FLOODING AND FRACTURING USING CLEAN, NON-DAMAGING FRACTURING FLUIDS

[75] Inventor: John W. Ely, Duncan, Okla.

[73] Assignee: Halliburton Company, Duncan, Okla.

[21] Appl. No.: 91,685

[22] Filed: Nov. 5, 1979

Related U.S. Application Data

[62] Division of Ser. No. 18,537, Mar. 8, 1979, abandoned.

[51] Int. Cl.[3] .............................................. E21B 43/22

[52] U.S. Cl. .................................... 166/271; 166/274; 166/283; 166/308; 252/8.55 R

[58] Field of Search ............... 166/294, 295, 274, 275, 166/308, 271, 283; 252/8.55 D, 8.55 R

[56] References Cited

U.S. PATENT DOCUMENTS

| | | | |
|---|---|---|---|
| 3,179,172 | 4/1965 | Reed et al. | 166/283 |
| 3,302,717 | 2/1967 | West et al. | 166/283 |
| 3,319,715 | 5/1967 | Parks | 166/283 |
| 3,415,319 | 12/1968 | Gibson | 166/295 |
| 3,477,512 | 11/1969 | Siegele | 166/308 X |
| 3,483,121 | 12/1969 | Jordan | 166/308 X |
| 3,490,533 | 1/1970 | McLaughlin | 166/275 X |
| 3,727,689 | 4/1973 | Clampitt | 166/283 |
| 3,779,914 | 12/1973 | Nimerick | 166/283 X |
| 4,175,042 | 11/1979 | Mondshine | 166/305 R |

*Primary Examiner*—Stephen J. Novosad
*Attorney, Agent, or Firm*—John H. Tregoning; Thomas R. Weaver; William R. Laney

[57] ABSTRACT

A fracturing fluid composition consisting essentially of a viscous aqueous solution having a high concentration of cations, an anionic or nonionic viscosifier imparting a high viscosity to the composition, and an anionic, polymeric fluid loss material which is substantially insoluble in the aqueous solution, and is soluble in fresh water substantially free of the cations in the fracturing fluid.

In the method of fracturing using the fracturing fluid compositions of the invention, the composition is injected into the fracture via the well bore to enlarge and/or extend the fracture. Completion of fracturing is followed by injection of fresh water into the fracture from the well bore to dissolve the anionic, polymeric fluid loss material, and displace the fracturing fluid composition into the formation upon continuation of a water flood operation.

17 Claims, No Drawings

METHODS OF WATER FLOODING AND FRACTURING USING CLEAN, NON-DAMAGING FRACTURING FLUIDS

This is a Division of application Ser. No. 18,537, filed Mar. 8, 1979, now abandoned.

This invention relates to fracturing compositions which are particularly useful in fracturing a formation in which water flooding is being used in a secondary recovery operation, and to methods for utilizing such compositions.

In a water flooding operation, a water injection well is utilized to inject water into a subterranean formation containing a relatively small amount of hydrocarbon which is thereby displaced to a recovery well. It is often desirable to fracture the formation to increase permeability, and thereby enhance the hydrocarbon recovery. As fracturing has previously been carried out in this context, conventional fracturing fluids, which include viscosifiers, fluid loss additives, breakers, propping agents and the like, have been directed via the injection well bore into the formation for the purpose of accomplishing fracturing in accordance with conventional techniques. Following fracturing, it has been necessary to produce the fracturing fluids back out of the injection well before the water injection can be resumed. This has been necessary because fluid loss additives included in the fracturing fluid, if not removed, would damage the formation upon further injection of water via the injection well. Further injection of water without prior removal of the fracturing fluid has resulted in restriction or clogging of the flow of water into the formation by the inert and water-insoluble fluid loss additives. Where attempts have been made in such water flooding procedures to reduce damage to the formation and alleviate the plugging which occurs as a result of the presence of inert, solid fluid loss additive materials, the solutions proposed for these problems have usually resulted in a sacrifice in the efficiency of the fracturing fluid in its primary function of quickly and efficiently fracturing the formation.

The present invention relates to fracturing compositions which can be used in fracturing in the course of, or ahead of, a fresh water flood without leaving a formation-damaging residue, without any requirement for back flowing in order to effect removal of the fracturing composition and without sacrifice of fracturing efficiency. The fracturing composition functions as described by reason of the inclusion therein of a high molecular weight, anionic polymeric fluid loss additive in a saline aqueous solution, or an aqueous solution containing a polyvalent cation in substantial concentration. The anionic polymeric fluid loss component of the composition, though functioning as an effective fluid loss additive during fracturing, and by reason of its insolubility at that time, is solubilized by the later injection of fresh water substantially free of salt and polyvalent cations.

In addition to the inclusion of sodium chloride, or a significant concentration of a polyvalent cation, and the insoluble anionic polymer, the fracturing composition further includes a primary viscosifier which will impart to the aqueous solution the necessary viscosity for hydraulic fracturing, and for carrying a proppant into the fracture. The composition preferably also includes one or more degrading or breaking agents to degrade the viscosifier after a desired time period.

As indicated, the fracturing compositions of the invention are used in water flood injection. It is here that the utility of the compositions in alleviating interruption of the water flooding following fracturing is realized, and the method of using the compositions can be broadly described as initially injecting water to commence a water flooding operation, followed by fracturing the formation to increase the permeability thereof to enhance hydrocarbon production, and using the fracturing fluid composition of the invention, followed directly by the further injection of fresh water substantially free of sodium or polyvalent cations immediately behind the fracturing fluid for the purpose of continuing the water flood injection.

The water base fracturing fluids constituted in accordance with the present invention include an effective concentration of sodium or a polyvalent cation which will synergistically interfunction with a high molecular weight, anionic polymeric material to render the latter material either insoluble in the aqueous solution, or incompatible with the fracturing fluid in a way which facilitates the functioning of the polymer as a fluid loss additive capable of precipitating out upon the formation adjacent the fracture, thus allowing the fracturing fluid to operate efficiently and without significant fluid loss.

Considered in greater detail, the fracturing compositions of the invention are water base sols containing a viscosifier, a relatively insoluble fluid loss additive, and preferably, a suitable propping agent. The composition also contains certain cations which, as previously indicated, function synergistically with the fluid loss agent to assure the insolubility of the latter material in the composition, and to allow it to be dissolved from the fractured formation upon subsequent flooding with fresh water relatively free of such cations. In most instances, the composition will also contain an effective amount of an internal breaker which functions to degrade the viscosifier upon completion of fracturing.

The types of cations useful in the water base fracturing composition include sodium and certain polyvalent cations. Any polyvalent cation which, as present, is soluble in ionic form in water to any appreciable extent is functional in the composition. Suitable polyvalent cations, for example, include Ca, Al, Sb, As, Ba, Bi, Cd, Ca, Cr, Co, Cu, Pb, Mn, Mg, Mo, Ni, Sn, Zn, Zr and Fe.

The concentration of cation in the fracturing composition can vary widely, and depends upon the particular fluid loss material used in the composition, and the characteristics which are desired in the subsequent water flood. For example, where it is desirable that the fluid loss material substantially increase the viscosity of at least the initial volume of water injected from the injection well during water flooding carried out after the fracturing step, a relatively high concentration of cation can be beneficially utilized in the fracturing composition. In this way, the insolubility of the fluid loss material in the fracturing composition is substantially increased, and the first volume of injected fresh water is "salted" with a dilute concentration of the cations utilized, thereby permitting the fluid loss material to impart some increase in viscosity to the injected water. In this way, the fluid loss material from the fracturing fluid subsequently functions in the water flood as a pusher material which aids in displacing water from the fractured formation toward the producing well.

In general, where sodium chloride is the material used as the source of cation in the fracturing fluid, the concentration of salt in the composition will preferably range from about 5 weight percent up to a saturated solution. In general, the polyvalent cations can be used in a concentration of from about 0.1 weight percent up to about 45 weight percent. Where calcium is used as the cation in the fracturing composition, it can be present, as calcium chloride, in a concentration of from about 0.1 weight percent up to a saturated solution, with a concentration of from about 2 weight percent to about 5 weight percent being preferred.

The fracturing composition includes a viscosifier which undergoes substantially complete hydration by the water present to form a sol and substantially increase the viscosity of the composition. The increase in viscosity of the composition enables fracturing to be carried out efficiently through the development of high pressure within the formation, and also functions to provide sufficient body and viscosity to permit both the fluid loss additive and a proppant to be carried well into the formation during the fracturing operation.

A number of materials function satisfactorily as viscosifiers in the composition. In general, the viscosifiers are anionic or nonionic in nature, are polymeric and are of relatively high molecular weight. The viscosifier must hydrate fully in the composition by uncoiling of the polymeric chain and acceptance of waters of hydration around the molecule. Examples of materials which can be suitably used as viscosifiers in the fracturing compositions include carboxymethylhydroxyethyl cellulose (slightly anionic), hydroxyethyl cellulose (nonionic), guar gums, galactomannon gums, karaya gum, shiraz and certain polyacrylamides. The preferred viscosifier is slightly anionic carboxymethylhydroxyethyl cellulose (CMHEC). This material works well in fracturing compositions in which the active cation is sodium or one of the suitable polyvalent cations. Further, in addition to performing well at low temperatures, it remains in solution and continues its viscosity-enhancing function at relatively high temperatures.

Hydroxyethyl cellulose (HEC) works well as a viscosifier. In saturated salt solutions, it is preferably used below about 140° F. At relatively higher temperatures and high salt concentrations, the HEC tends to come out of solution and lose its viscosifying function, and to then function more as a fluid loss additive under such conditions. The solubility of HEC and its susceptibility to sol formation upon hydration at relatively higher temperatures is enhanced through the use of a small amount of methanol in the fracturing compositions. The HEC is preferably used in aqueous solutions which contain polyvalent cations, rather than sodium, as the precipitant of the fluid loss material.

Other slightly anionic cellulosic derivatives can also be used as the component used to increase the viscosity of the fracturing composition.

When a guar gum is utilized as the viscosifying component of the fracturing composition, it is preferable to adjust the pH of the composition to a value lower than 10 to assure adequate hydration of the guar gum. Further, the guar gum viscosifiers are preferably employed in a fracturing composition which is high in sodium ion concentration. These viscosifiers can be used, however, in compositions containing a relatively low concentration of calcium or other polyvalent ion, e.g., from about 0.1 weight percent to about 35.0 weight percent. The preferred guar gum for use as a viscosifier in the fracturing fluids of the invention is polyhydroxypropyl guar gum. This synthetic guar gum derivative gives superior results, when used, because it is substantially completely degradable by the use of suitable internal breaker enzymes after the fracturing is completed.

A selected internal breaker compound is preferably included in the composition. A suitable amount is used to provide assurance that the viscosifier employed will be molecularly degraded to substantially reduce the viscosity of the fracturing composition from its relatively high viscosity during fracturing after a sufficient time has passed to permit fracturing to be completed, and prior to the time that the water flood follow-up is commenced. The functional characteristics of various types of internal breakers, including enzymes, oxidizers, and acids, are well known in the art, and the selection of an effective enzyme, depending on the particular type of viscosifier used, will be well within the skill of the art. In general, enzymes function very well in the degradation of guar gum viscosifiers and cellulosic materials. The amount of internal breaker which should be used is also well understood in the art.

The amount of the viscosifier which is used in the fracturing composition can vary widely, and will depend on a number of factors, including the pumping equipment which is available for pumping the fracturing fluid into the formation and developing the pressure necessary for fracturing, the character of the following water flood which is desired (that is, whether it is preferred that the following water flood have a relatively high viscosity for purposes of better displacing the hydrocarbon toward the producing well), and the amount of proppant or fluid loss material which is to be carried in the fracturing fluid. In general, the amount of viscosifier added can range from an amount sufficient to bring about any increase in the viscosity of the fracturing composition above that of water, to a viscosity constituting the limit which can be tolerated by the pumping equipment available and in use.

The fluid loss agent constituting the final principal component of the fracturing composition basically must be a material which does not undergo significant solution in the aqueous base fluid containing one of the described cations, and which does not impart any significant increase to the viscosity of the composition. As previously pointed out, the material used as the fluid loss additive in the composition synergistically interfunctions with the sodium, calcium or other cation present in the composition in a way such that the fluid loss material will remain substantially insoluble in the composition. The fluid loss material will typically undergo swelling so as to create gel balls. Where a relatively high molecular weight polymer is utilized, either no uncoiling or only a slight uncoiling of the polymer chain occurs. Basically, the fluid loss agent must have the ability, when functioning in the fracturing composition during the fracturing operation, to precipitate upon the formation face and to build up at that location to prevent loss of the fracturing fluid from the fracture situs and thus reduce the efficiency of the fracturing operation.

The fluid loss additives employed in the fracturing composition of the invention are relatively highly anionic, relatively high molecular weight polymeric compounds. Preferably, the molecular weight of the anionic polymer exceeds about 50,000, and above this value, the molecular weight of the fluid loss additive can vary widely. The degree of the anionic character of the additive can also vary widely.

As a general proposition, the material functioning as the fluid loss additive in the composition will be more anionic in character than the material constituting the viscosifier in the same composition. The same polymeric material can function as a viscosifier in one fracturing fluid, and as a fluid loss additive in a different fracturing fluid. This is because the susceptability to hydration of the various polymers useful in the composition is a function of both the degree of cation "salting" of the composition, and of the degree of anionic character of the polymer. The higher the cation concentration, the more insoluble is a polymer of a given degree of anionic character. The lower the cation concentration, the more soluble is a polymer of a given degree of anionic character. Thus, for example, by selectively varying the cation concentration, it is possible to use weakly anionic CMHEC as either the viscosifier or as the fluid loss additive.

The material functioning as the fluid loss additive will have a degree of anionic character such that, in a fracturing fluid of given cationic concentration, it undergoes hydrolysis to a minimum degree of 7 percent and a maximum degree of 50 to 60 percent. As earlier stated, the viscosifier is less anionic and will undergo substantially complete hydration.

Typical suitable fluid loss additives include high molecular weight (1,000,000 to 20,000,000) polyacrylamides, which have been hydrolized to form anionic polyacryates high molecular weight, highly anionic CMHEC polymers, high molecular weight (50,000 to 1,000,000) CMC or any high molecular weight water soluble polymer having sufficient anionic character to be insoluble in highly saline solution or in the presence of cations. The most preferred fluid loss additives are high molecular weight polyacrylamides which include the structural group

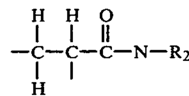

where R=H or an alkyl group.

These materials provide the advantage of increasing the viscosity of fresh, cation-free water used in the ensuing water flood, and thus provide a pusher function enabling the water flood to more efficiently displace hydrocarbon from the fractured formation.

The amount of fluid loss additive incorporated in the fracturing fluid can be varied over a substantial range, and generally is subject to criteria of selection well understood in the art. Typically, however, an amount ranging from about 10 lbs. to about 150 lbs. per 1000 gals. of the fracturing composition will be employed.

In practicing the method of the invention, the fracturing composition can be initially utilized prior to water flooding, or it can be used intermittently with water injections. In making up the fracturing compositions, the fluid loss additive can be added to the viscosified, cation-containing base fluid in a batch procedure, or can be added continuously to the base fluid as it is being injected into the formation to be fractured. In general, fracturing using the composition of the invention can be carried out over a wide temperature range extending from about 40° F. to about 450° F. The propensity of some viscosifier additives to precipitate from the composition at higher temperatures, however, as previously described herein, should be noted. Where such propensity exists, a suitable solubilizer, such as methanol, should be added in an amount effective to obviate or reduce such precipitation, or one of the viscosifiers which functions more effectively at the higher temperature should instead be selected. Although, as previously indicated, the viscosity of the fracturing composition can vary widely, and is limited primarily by the capacity of the pumping equipment in use, a typical viscosity of the fracturing composition will be from 70 to 100 centipoises as measured by a FANN viscometer operated at 300 rpm.

After completion of the fracturing step, fresh water is injected into the formation. At this time, the fluid loss material goes into solution in the fresh water and moves with the water flood into the formation to displace the hydrocarbons toward the production well. In most cases, an internal breaker, selected for its ability to break down the viscosifier after passage of an appropriate time period, will have so functioned so that the degraded viscosifier also enters the incoming fresh water, and does not substantially increase the viscosity of the water. The net result is that there is no debris or residue left in the formation at the time of commencement of the water injection step, and there is therefore no need to back flush or produce the injection well to remove damaging residue or debris.

In some instances, it is desirable to increase the viscosity of the injected water in order to more efficiently displace hydrocarbon to the producing well. In this event, the particular fluid loss additive included in the fracturing composition can be selected to impart some increase in viscosity to the injected water, or a slightly saline water may be used in the water injection step to deliver some increase in viscosity to the flood as a result of the slight interaction of the slightly saline water with the fluid loss additive. It will also be apparent that where a pushing effect is sought through increase in the viscosity of the water flood, this result can be attained by effecting a less than complete degradation of the viscosifier utilized in the fracturing composition, thus permitting the viscosifier to continue to function in increasing the viscosity of the water flood.

In a laboratory test of the invention, 50 lbs. of hydroxyethyl cellulose are added to 1000 gals. of water containing 2 weight percent calcium chloride. After thoroughly mixing to assure complete hydration of the hydroxyethyl cellulose and the formation of a sol of the consistency of honey, 100 lbs. of an polyacrylamide which includes the structural group

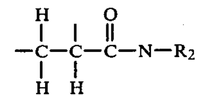

where R is hydrogen or alkyl, and having a molecular weight of about 1,000,000 is added to the viscous base fluid.

The fracturing fluid as thus prepared is forced through a Berea sandstone high permeability core at a pressure of 1000 psi and ambient temperature. The fluid loss through the core is measured with passing time, and the data obtained are as follows:

| Time (min.) | Value of Fluid Loss (ml) |
|---|---|
| 1 | 14.0 |
| 4 | 18.0 |
| 9 | 22.0 |
| 16 | 25.5 |

-continued

| Time (min.) | Value of Fluid Loss (ml) |
|---|---|
| 25 | 28.5 |
| 36 | 30.5 |

The data obtained in the course of the core test show relatively high spurt and $C_w$ values.

Although preferred embodiments of the invention have been herein described, it will be understood that various changes in the kinds and amounts of materials used in the compositions of the invention can be effected without departure from the basic principles which underlie the invention. Modifications of this type are deemed to be within the spirit and scope of the invention except as the same may be necessarily limited by the appended claims or reasonable equivalents thereof.

What is claimed is:

1. A method of producing hydrocarbon from a subterranean formation comprising:
   - drilling an injection well and a producing well from the surface into the formation at spaced locations;
   - injecting into the formation via the injection well at a pressure sufficient to hydraulically fracture said formation a cation-containing, viscous water base fracturing composition containing a solid, water soluble high molecular weight polymeric fluid loss compound selected from the group consisting of polyacrylamide, carboxymethyl cellulose and carboxymethyl hydroxyethyl cellulose which is insoluble in the fracturing composition liquid phase due to the presence of said cation, wherein said polyacrylamide has a molecular weight in the range of about 1 to about 20 million and said carboxymethyl cellulose has a molecular weight in the range of about 50,000 to 1,000,000; and
   - injecting fresh water free of said cations into the formation via the fracture to dissolve the fluid loss compound and displace the hydrocarbon toward the producing well.

2. A method of fracture treating a subterranean hydrocarbon-producing formation penetrated by an injection well and a producing well, said method consisting essentially of:
   - forming a fracture in said formation by introducing therein, under fracturing conditions via said injection well, a viscous water base fracturing composition comprising a viscosifier, a cation and a solid, water soluble high molecular weight polymeric fluid loss compound selected from the group consisting of polyacrylamide, carboxymethyl cellulose and carboxymethyl hydroxyethyl cellulose which is insoluble in said fracturing composition liquid phase in the presence of said cation; wherein said polyacrylamide has a molecular weight in the range of about 1 to about 20 million and said carboxymethyl cellulose has a molecular weight in the range of about 50,000 to 1,000,000
   - introducing into said formation via said injection well and said fracture a quantity of water free of said cation whereby said fluid loss compound dissolves and hydrocarbons present in said formation are displaced toward said producing well.

3. The method of claim 2 wherein said cation is selected from the group consisting of sodium and the polyvalent cations of Ba, Bi, Cd, Ca, Cr, Co, Cu, Pb, Mn, Mg, Mo, Ni, Sn, Zn, Zr and Fe, and said fluid loss compound is more anionic in character than said viscosifier.

4. The method of claim 3 wherein said viscosifier is selected from hydratable anionic and nonionic polymeric cellulose derivatives and natural gums.

5. The method of claim 4 wherein said viscosifier is anionic carboxymethylhydroxyethyl cellulose.

6. The method of claim 4 wherein said viscosifier is hydroxyethyl cellulose.

7. The method of claim 6 wherein said cation is calcium.

8. The method of claim 6 wherein said fracturing composition contains an amount of methanol effective to retain said hydroxyethyl cellulose in solution at temperatures exceeding 140° F.

9. The method of claim 4 wherein said viscosifier is guar gum.

10. The method of claim 3 wherein said cation is sodium.

11. The method of claim 3 wherein said fluid loss compound is an anionic polyacrylamide which includes the structural group $$-\overset{H}{\underset{H}{\overset{|}{\underset{|}{C}}}}-\overset{H}{\overset{|}{\underset{|}{C}}}-\overset{O}{\overset{\|}{C}}-N-R_2$$

where R is H or an alkyl group, having a molecular weight of from about 1 million to about 20 million.

12. The method of claim 3 wherein said fracturing composition further includes an internal breaker for molecularly degrading said viscosifier following a preselected time delay.

13. The method of claim 12 wherein said internal breaker is selected from the group consisting of enzymes and oxidizing compounds.

14. The method of claim 3 wherein said fracturing composition contains from about 20 pounds to about 150 pounds of said polymeric fluid loss compound per 1000 gallons of fracturing composition.

15. The method of claim 14 wherein said viscosifier is selected from the group consisting of anionic and nonionic polymeric cellulose derivatives and natural gums.

16. The method of claim 15 wherein said fracturing composition further includes an internal breaker for molecularly degrading the viscosifier compound following a preselected time delay.

17. The method of claim 3 wherein said fracturing composition further includes an effective amount of a proppant.

* * * * *